United States Patent [19]

Finney

[11] Patent Number: 4,460,950

[45] Date of Patent: Jul. 17, 1984

[54] CONTROLLED BRIDGE RECTIFIER

[75] Inventor: David Finney, Northamptonshire, England

[73] Assignee: Gec-Elliott Automation Limited, England

[21] Appl. No.: 433,251

[22] Filed: Oct. 7, 1982

[30] Foreign Application Priority Data

Oct. 9, 1981 [GB] United Kingdom ............... 8130584

[51] Int. Cl.³ .......................................... H02M 7/155
[52] U.S. Cl. ..................................... 363/44; 363/129
[58] Field of Search ................... 363/43, 44, 64, 128, 363/129

[56] References Cited

U.S. PATENT DOCUMENTS

| | | | |
|---|---|---|---|
| 3,431,483 | 3/1969 | Lafuze | 363/64 X |
| 3,657,633 | 4/1972 | Urish | 363/43 X |
| 3,739,253 | 6/1973 | Humphrey et al. | 363/43 X |
| 4,131,936 | 12/1978 | Gemp | 363/43 |
| 4,225,914 | 9/1980 | Hirata et al. | 363/43 X |
| 4,245,293 | 1/1981 | Terunuma et al. | 363/128 X |
| 4,276,589 | 6/1981 | Okawa et al. | 363/43 X |
| 4,361,866 | 11/1982 | Shima et al. | 363/44 X |

Primary Examiner—William M. Shoop
Attorney, Agent, or Firm—Kirschstein, Kirschstein, Ottinger & Israel

[57] ABSTRACT

A rectifier system in which the harmonic content of the A.C. current is reduced in a particularly efficient manner. Two or more 3-phase thyristor bridges are connected in parallel to the A.C. supply, and to the DC output by way of interphase-transformers. For the positive thyristors, and for the negative thyristors separately, the conduction transitions within each bridge are staggered from one bridge to the next so that the total conduction on each phase follows a stepped characteristic approaching a sine wave and thus having a smaller harmonic content than a comparable arrangement having uniform firing angles from bridge to bridge.

8 Claims, 10 Drawing Figures

CONTROLLED BRIDGE RECTIFIER

This invention relates to controlled bridge rectifiers and particularly, although not exclusively, to thyristor power converters for use in supplying variable speed drives, electrochemical plant and D.C. transmission systems for example i.e. D.C. loads which are essentially non-linear and does draw constant D.C. current when subject to rectified sinusoidal applied voltage. Such converters commonly employ natural commutation in which, on a multi-phase A.C. supply, each thyristor, on firing, takes up the conduction of another thyristor on a preceding phase. It is with such natural commutation that the present invention is concerned.

FIG. 1 of the accompanying drawing shows a prior art conventional 3-phase thyristor rectifier supplying a D.C. load from an A.C. supply. Unfortunately the current drawn from the A.C. is far from sinusoidal and consists of quasi square wave pulses as shown in FIG. 2, this showing the current drawn from one particular phase, of the prior art rectifier of FIG. 1 the others being similar but displaced of course. Such square-wave currents have a very significant harmonic content, 20% of the fundamental as 5th harmonic, 14% as 7th harmonic, 9% as 11th, as 13th and so on.

The conventional way of reducing the level of harmonics in the supply network current is to connect two such rectifiers, each carrying half of the drive power, via a phase displacing transformer to the power supply. With a phase displacement of 30 electrical degrees between these two units the result is complete cancellation of the 5th and 7th harmonics, leaving approximately 9% of 11th and 8% of 13th as the predominant harmonics—an arrangement commonly known as a 12-pulse converter system.

An object of the present invention is to provide an alternative means of reducing the harmonic content of the A.C. supply current without the necessity for a phase displacing transformer.

According to one aspect of the present invention, in a bridge rectifier comprising a plurality of controlled-rectifier bridge circuits having common A.C. terminals and common D.C. terminals, firing circuit means is arranged to fire like-polarity controlled-rectifiers of each bridge circuit in phase sequence and to fire corresponding controlled-rectifiers of the plurality of bridge circuits in a sequence such that said corresponding controlled-rectifiers are rendered conductive for respective periods which overlap so as to provide regularly graduated A.C. current pulses.

According to another aspect of the invention, in a multi-bridge circuit multi-phase rectifier having common A.C. terminals and common D.C. terminals, each bridge circuit comprising positive controlled rectifiers connected to a positive D.C. terminal and negative controlled rectifiers connected to a negative D.C. terminal, firing circuit means is arranged to fire the positive controlled rectifiers in each bridge circuit in sequence and for a cycle of conduction periods which vary within the cycle by a predetermined delay and multiples thereof, the negative controlled rectifiers being fired in complementary manner, each bridge circuit being fired in the same cycle of conduction periods but staggered from bridge circuit to bridge circuit so that the conduction periods for the different bridges on any one phase contribute to a graduated A.C. current pulse.

According to a further aspect of the invention, in a method of controlling a multi-bridge circuit multi-phase rectifier having common A.C. terminals and common D.C. terminals, each bridge circuit comprising positive controlled rectifiers connected to a positive D.C. terminal and negative controlled rectifiers connected to a negative D.C. terminal, for each phase the positive controlled rectifiers are fired in sequence, the firing delays between bridge circuits being a multiple of the number of phases and firing sequences throughout a cycle of the A.C. system are cycled through the bridge circuits in successive cycles of the A.C. system.

Several arrangements of thyristor bridge rectifier, in accordance with the invention, will now be described, by way of example, with reference to the accompanying drawings, of which:

Figure 9:
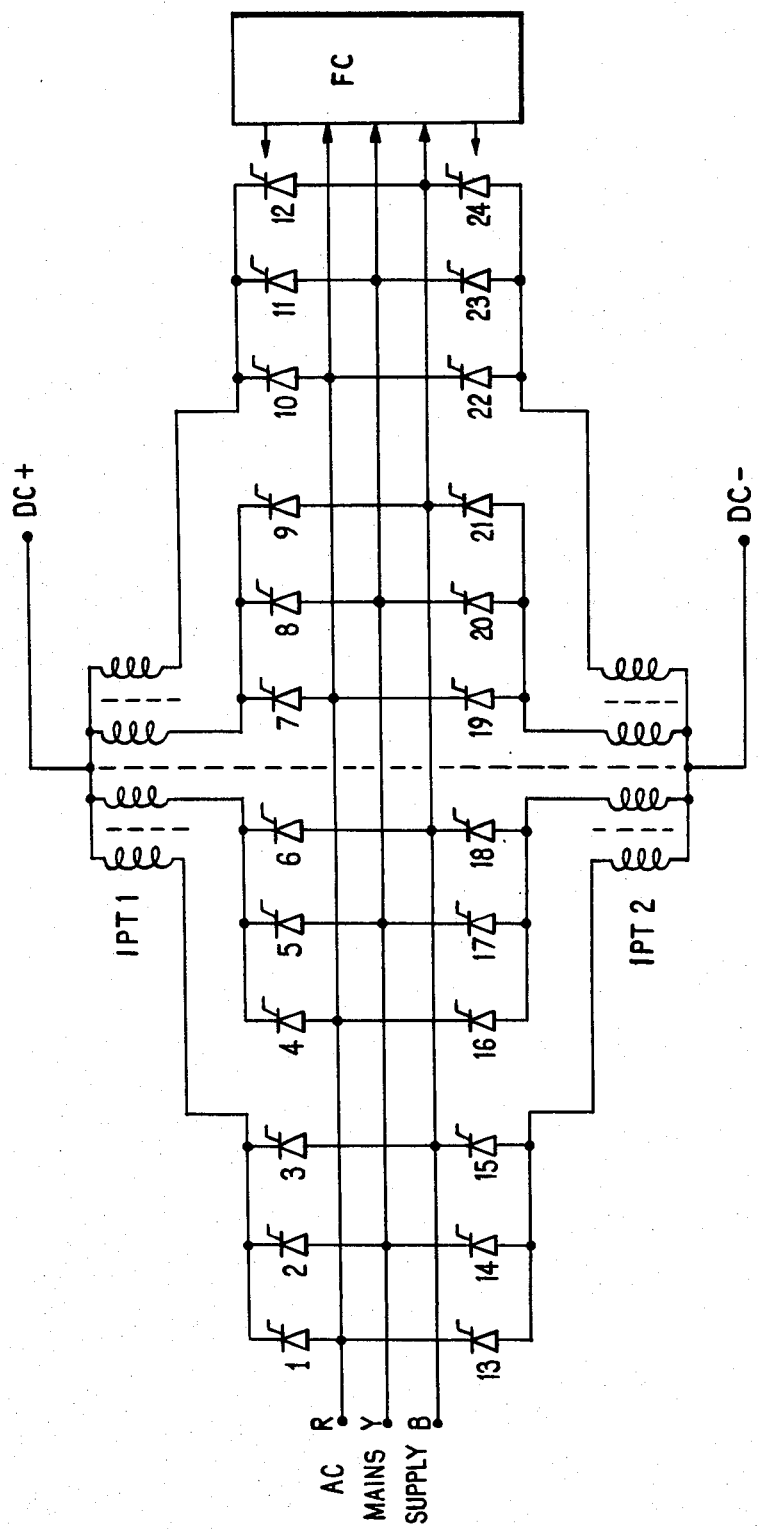
Figure 10:
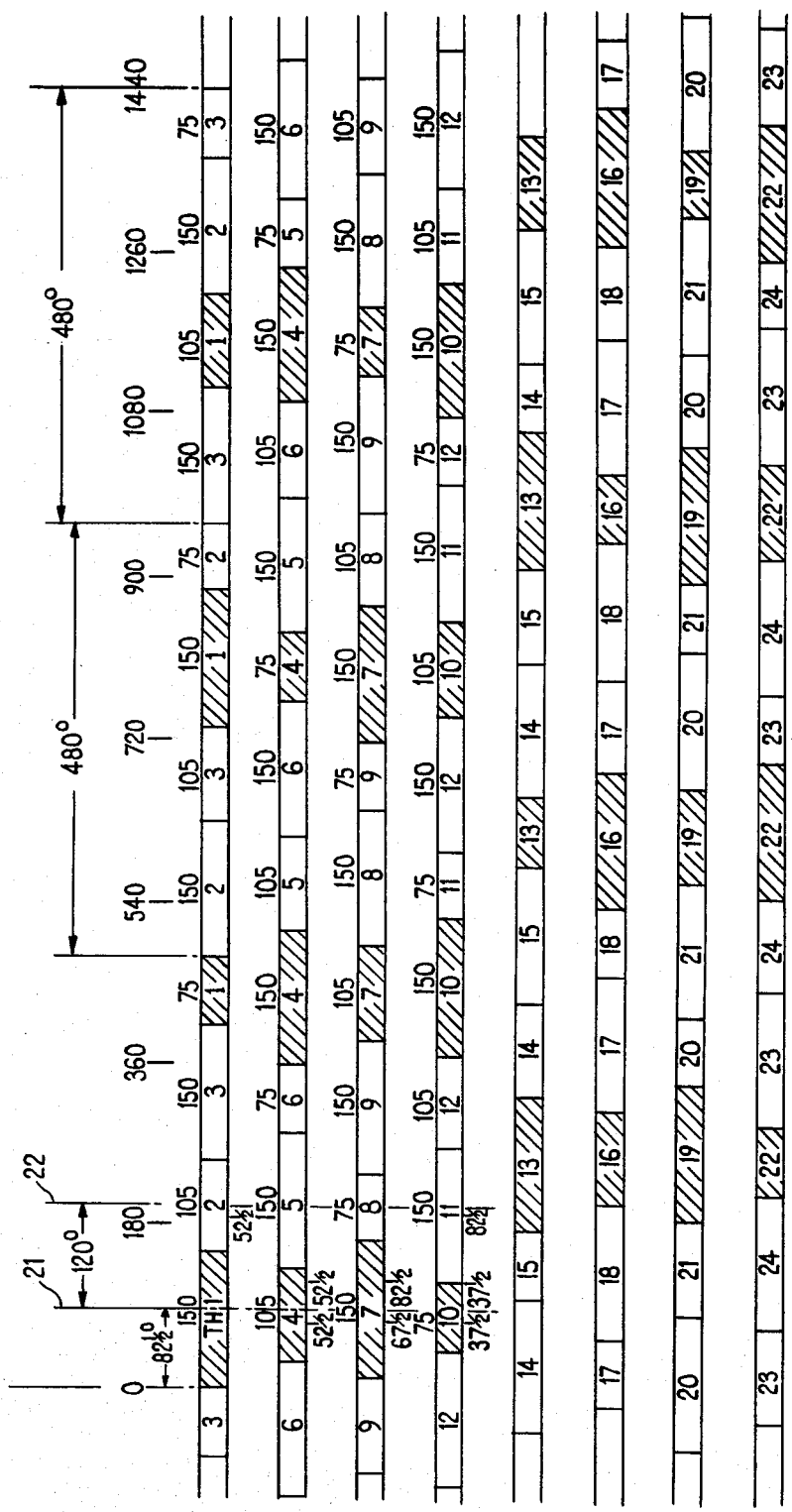

and FIGS. 9 and 10 show a quadruple bridge converter and the corresponding timing diagram.

Figure 1:
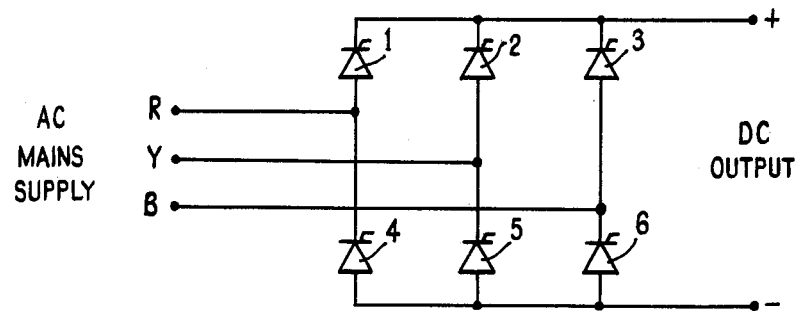
FIG. 1 shows a conventional prior art 3-phase thyristor bridge rectifier.
Figure 2:
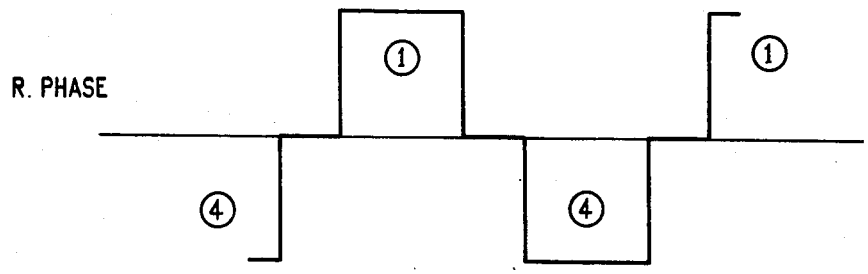
FIG. 2 shows the current waveform in one phase of the A.C. supply to the prior art rectifier of FIG. 1.

Referring to FIG. 1, a conventional 3-phase bridge converter has A.C. supply terminals R, Y and B and D.C. load terminals marked + and −. The bridge comprises two sets of thyristors, a 'positive' set 1, 2 and 3, and a 'negative' set, 4, 5 and 6. The firing circuitry is not shown but is normally arranged to provide firing pulses to the gates of the thyristors in the order 1,6,2,4,3,5, as each anode (1,2,3) becomes the most positive and each cathode (4,5,6) becomes the most negative. This gives a conduction period of 120° for every thyristor, and 120° square-wave pulses in each phase of the A.C. supply, as shown in FIG. 2.

Each thyristor shown in FIG. 1 may be constituted by a group of thyristors in any parallel/series combination appropriate to the rating of the devices available and the application, and reference to a thyristor is to be understood accordingly.

The invention requires at least duplicate bridge circuits and accordingly reference will now be made to FIG. 3. The converter shown here has two bridges having A.C. terminals R, Y and B connected directly in parallel and D.C. terminals connected in parallel by way of two identical inter-phase transformers I.P.T.1 and I.P.T.2.

Figure 5:
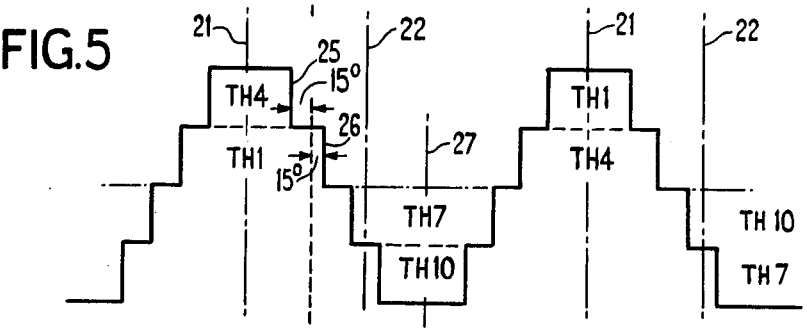
FIG. 5 shows the waveform of one phase of the current supply to the rectifier of FIG. 3.

Referring back to FIG. 2, it may be seen that a closer approximation to a sinusoid may be obtained by re-shaping the 120° square-wave pulse to a form such as that in FIG. 5. By firing the 12 thyristors sequentially in a suitable pattern it is possible to produce an A.C. current which more closely approximates to a sinusoid than does that of FIG. 2. Thus an A.C. current waveshape is obtained which has 8 steps per cycle rather than 4, as shown in FIG. 5. When such an 8 step waveform is analysed by any of the conventional means such as fourier analysis it is found to contain a lower level of harmonics than is contained in the waveshape of FIG. 2.

If the A.C. waveform is to remain uniform from phase to phase, the transitions between the 'steps' of the pulse must be symmetrically disposed between the centre of one pulse and the centre of the next, same polarity pulse on the succeeding phase. This applies to the positive pulses and to the negative pulses separately, so that there need not be a continuous series of equally spaced steps between successive positive and negative peaks of the same phase but only two series of steps each following the above symmetry requirement. They are, of course, preferably chosen to coalesce into a single series as shown in FIG. 5.

In FIG. 5 the centre lines of the positive pulses of phase R are referenced 21 and those for the positive pulses (not shown) of phase Y (the next succeeding phase) are referenced 22. These centre lines are spaced at 120°. In accordance with the above requirement it may be seen that the transitions 25 and 26 of the positive 'R' pulse occur symmetrically between these two centre lines, and, in fact, ±15° off centre.

Figure 3:
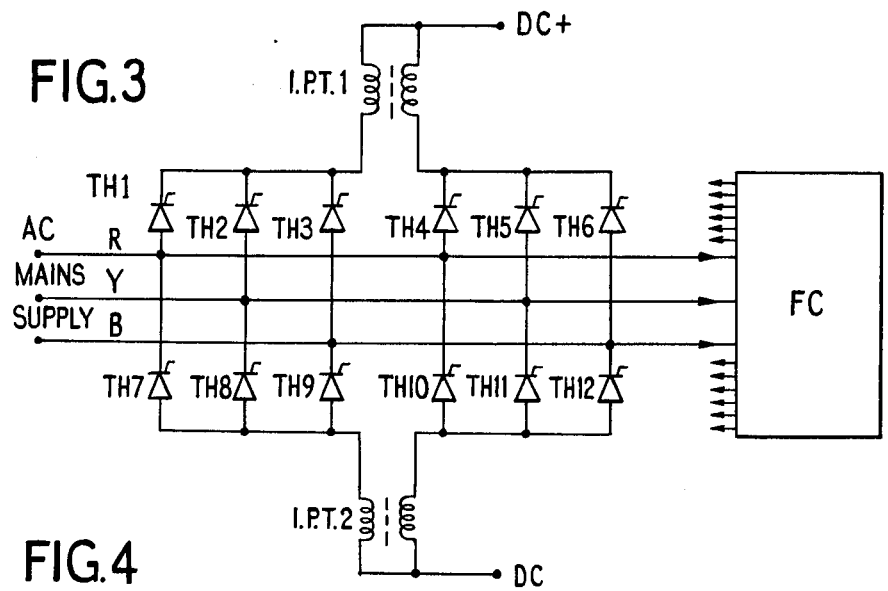
FIG. 3 shows a 3-phase double bridge operable in accordance with the invention.
Figure 4:
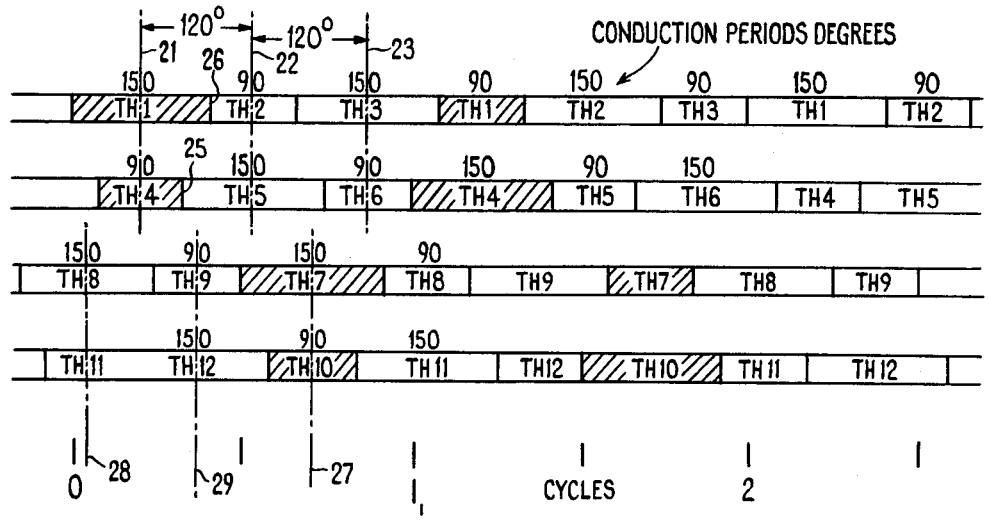
FIG. 4 shows a firing and conduction timing diagram for the four sets of thyristors of the double bridge of FIG. 3.

FIG. 4 shows the firing intervals for all of the thyristors of FIG. 3 in four rows. The first row illustrates the conduction periods of the first set of thyristors 1, 2 and 3, the next row illustrates the second set (4, 5 & 6) of conduction periods, and so on. The thyristors of each set (e.g. 1, 2 and 3), being distributed amongst the phases and having their cathodes (or anodes) connected in common to a D.C. output terminal, each conduct until the next thyristor in phase sequence is fired. The three thyristors therefore conduct, one at a time, for a whole period of operation.

The firing pulses for the various thyristors are obtained from a firing circuit FC which is connected to and triggered from the A.C. supply to produce firing pulses timed in relation to the natural commutation points and distributed as will be explained.

Referring to FIG. 5, and starting from the centre of the R phase positive pulse, i.e. line 21, thyristor 4 conduction is terminated by firing thyristor 5 on the Y phase and thyristor 1 conduction is terminated by firing thyristor 2 on the Y phase. Thyristor 2 in turn gives place to thyristor 3 and thyristor 5 to thyristor 1 and 4 and the cycle repeats.

With the particular step chosen in FIG. 5 (±15°), the conduction periods resulting in FIG. 4 become 150° and 90° alternately throughout the 3-phase cycles.

The particular step chosen in FIG. 5 of ±15° is only an example, in specific cases other values may be more satisfactory in reducing the harmonic content; this is more likely to be the case when due allowance is made for the time taken for the current to rise during the step changes.

The pulse centres 27, 28 and 29 of the 'negative' thyristors 7, 8, 9 and 10, 11, 12 are, of course, displaced by 180° from those of the positive thyristors but the same symmetry requirement applies in that the conduction transitions are symmetrically disposed between these pulse centre lines.

In the arrangement of FIGS. 3, 4 and 5, each thyristor conduction period was symmetrical about its pulse centre. It is not necessary that this be the case, as will be seen by reference to FIGS. 6, 7 and 8 which correspond to FIGS. 3, 4 and 5 but for a triple-bridge converter.

Figure 6:
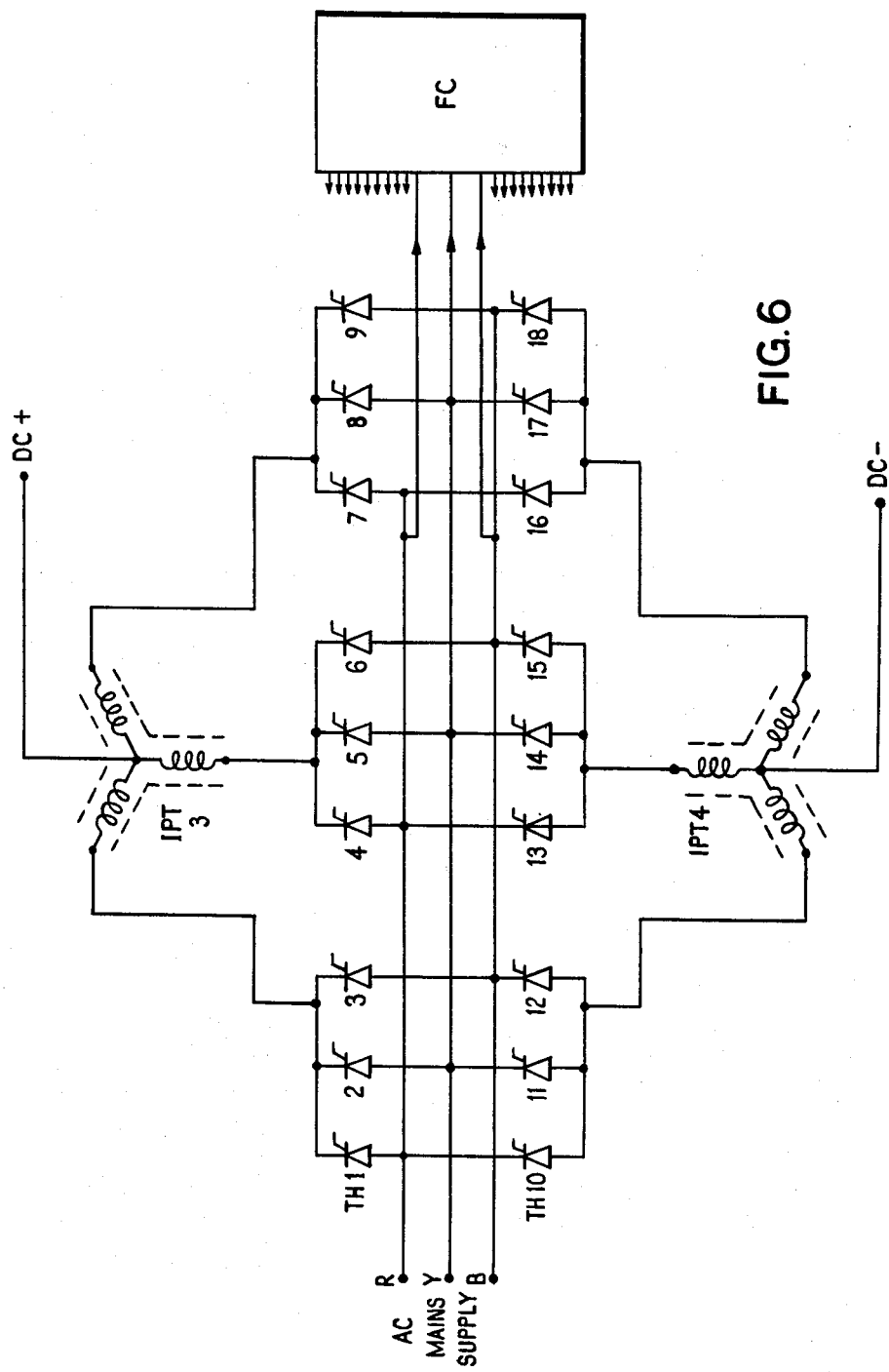

FIG. 6 shows the three 3-phase bridges connected in parallel by two interphase transformers IPT 3 and IPT 4, these being arranged in star connection with the star points providing the D.C. terminals DC+ and DC−. In this arrangement there are three sets of positive thyristors 1, 2, 3; 4, 5, 6 and 7, 8, 9. There are similarly three sets of negative thyristors 10, 11, 12; 13, 14, 15; and 16, 17, 18.

Figure 8:
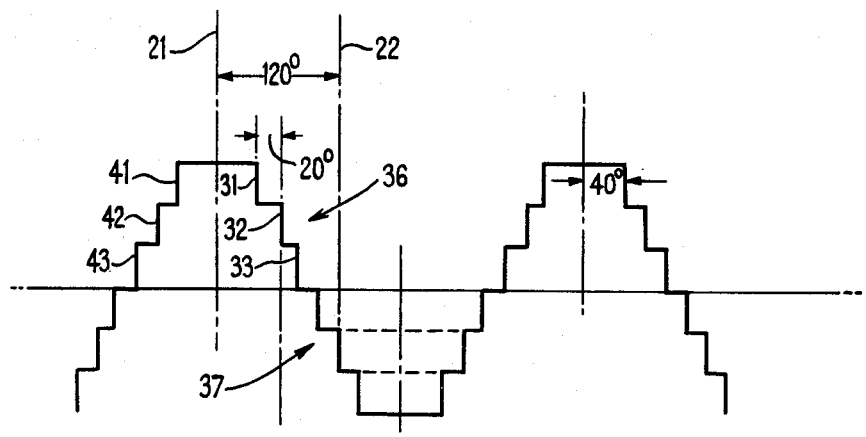
FIGS. 6, 7 and 8 are similar to FIGS. 3, 4 and 5 in respect of a triple bridge rectifier.
Figure 7:
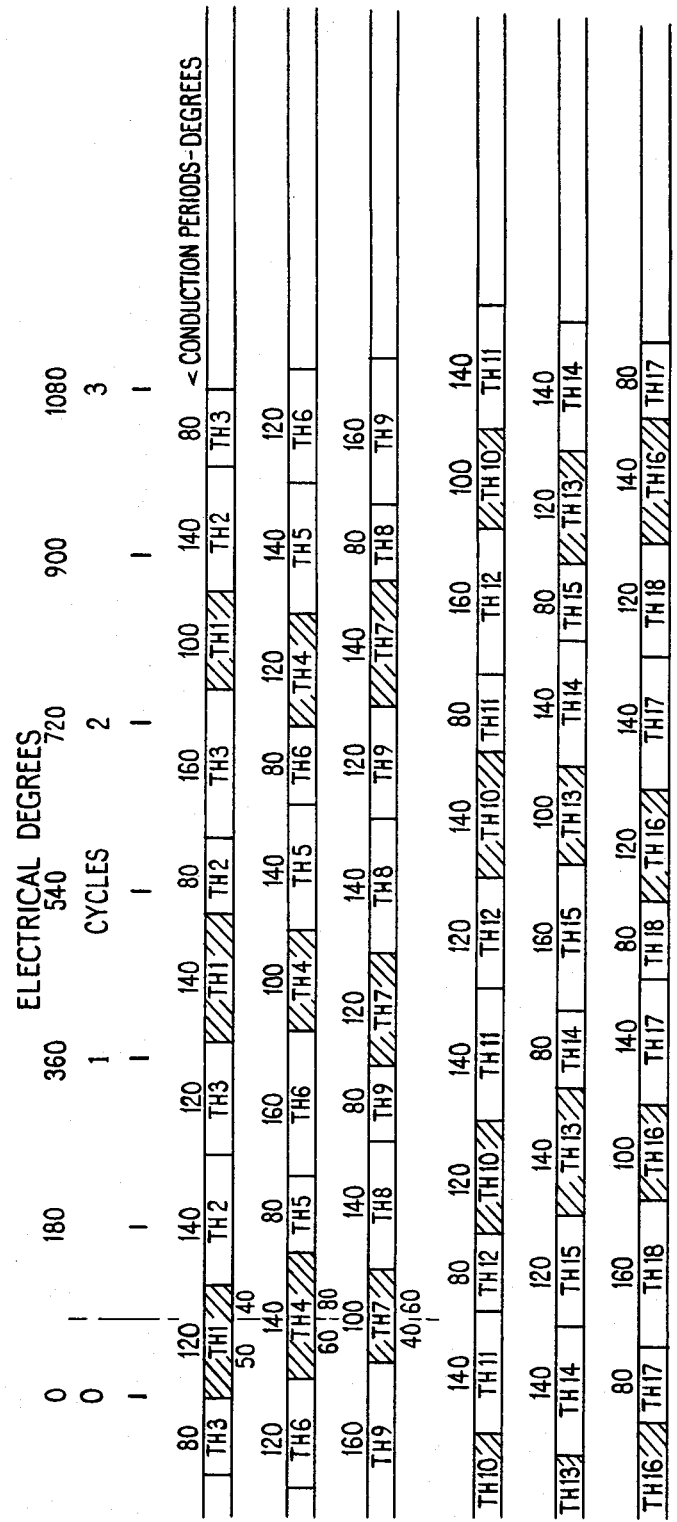

By using the 18 sequentially fired thyristors it is now possible to produce an A.C. current waveform with 12 steps per cycle making it possible to approach a sinusoid even more closely, as shown in FIG. 8, which is shown with 20 degrees between steps to match up with the firing and conduction pattern of FIG. 7.

In FIG. 8 the pulses have been graded in the three levels available from corresponding thyristors in three bridges. It will be seen that the three transitions 31, 32 and 33 are again symmetrically disposed between the R & Y pulse centre lines 21 and 22 as originally specified above. In addition to this basic symmetry requirement the 'sides' of the positive and negative pulses 36 and 37 can be made to form a continuous 'staircase' passing through zero by proper selection of the step value between levels. It can be shown simply that the required step value to obtain this continuity is 60/n where 'n' is the number of levels in each positive (or negative) pulse. Thus, in the case of FIGS. 6 and 8 there are three bridges, thus three levels, and the step value consequently 20° as shown in FIG. 8. FIG. 5, for two bridges, similarly gave a step value of 30°.

Having established the positions of the transitions 31, 32 and 33 as above it then becomes necessary to allocate these transitions amongst the various thyristors. In FIG. 4, each 'level', or slice, of the current pulse, as shown in FIG. 5, was supplied by a single thyristor. It is not necessary that this be so and in FIGS. 6, 7 and 8 the conduction periods of conduction periods of corresponding thyristors (e.g. 1, 4 and 7—thyristors of the same polarity on the same phase) are not symmetrical about the pulse centre. Thus, in FIG. 7, for the first positive pulse shown shaded, thyristor 1 provides transitions 43 and 31, thyristor 4 provides transitions 42 and 33, and thyristor 7 provides transitions 41 and 32.

Transitions 41, 42 and 43 are therefore provided by suitably timed firing of thyristors 7, 4 and 1, and transitions 31, 32 and 33 are provided by similarly firing thyristors 2, 5 and 8, i.e. the next set of corresponding thyristors. In this next set of corresponding thyristors (on the Y phase) the transition positions are now determined but there is again some freedom to distribute the termination transitions of the conduction periods amongst the three thyristors 2, 5 and 8. It may be seen that thyristor 2 has been chosen to provide the transition (corresponding to) 31, thryristor 8 transition 32, and thyristor 5 transition 33. These transitions are in fact provided by firing the next set of corresponding thyristors 6, 3 and 9 in that order.

One cycle of the three bridges has now been completed but it will be apparent that the three bridges have been conductive for different total periods, i.e. not simple 360°, and therefore this cycle could not simply be repeated. Referring to FIG. 7 it may be seen that the thyristors of the first bridge have been conducting for 380°, those of the second bridge for 380° and the third for 320°. Since the average of these figures is 360°, if the various thyristor conduction periods are cycled through the bridges over 3×360° then this 'super' cycle can be repeated every 1080° without any phase-slip. In FIG. 7 the conduction periods of each bridge are cycled to the preceding bridge in the next 360° cycle. Thus bridge 1 has conduction periods 120°, 140° and 120° in the first cycle and these are transferred to bridge 3 in the second cycle and bridge 2 in the third cycle. The other bridge conduction periods in the first cycle, i.e. 140°, 80° and 160°, and 100°, 140° and 80°, are cycled similarly. A complete 'super-cycle' is shown in FIG. 7.

The negative pulses may be derived by a direct replica of the positive conduction periods entirely displaced by 180°. Alternatively they may be derived independently in accordance with the above considerations.

It may be seen that the determination of the firing times of the various thyristors, can be related to the natural commutation points in the A.C. cycle, which in the usual 3-phase system, are spaced at 120°. For each phase, the firing points of 'corresponding' thyristors (i.e. thyristors on the same phase and the same D.C. polarity) are delayed by the successive multiples of the above predetermined step value. For example, in a four-bridge rectifier this value is 15° and the firing points are delayed from their associated natural commutation points by 0°, 15°, 30° and 45°. Any distribution or sequence of these delays through the bridges will achieve the desired stepped pulse if corresponding thyristors on the succeeding phase are fired in the same sequence cycled through one step. Thus the same cyclic sequence of conduction periods occurs in the thyristors of each bridge as in corresponding thyristors on each phase.

While a distribution of the above delays can be selected randomly, it will be clear that certain combinations will produce a wide range of thyristor conduction periods while other combinations will produce smaller ranges. Despite the fact that thyristor conduction periods have been arranged to average out to a single value over several cycles of the A.C. system, it is desirable not to have wide variations within that period. A low-variation combination of delay periods is therefore selected.

The allocation of parts of the total current to the various thyristors connected to the same A.C. supply line can be done in many ways as indicated above but the choice is restricted by the necessity to correctly commutate the current from one thyristor to another by using the A.C. voltage sine wave. FIG. 7 indicates one suitable firing and conduction pattern which fulfils the required commutation limitations and enables the average current (over a number of cycles) in each thyristor to be the same. In this case this means that every thyristor conducts for a total of 360 degrees in every 3 cycles of the mains supply and that the pattern of firing repeats itself every 'supercycle' of 1080 degrees, as mentioned above.

Further refinement of the A.C. pulse shape can be obtained by addition of further bridges. FIG. 9 shows a quadruple bridge arrangement the four bridges again having D.C. outputs coupled by transformer. One particular timing diagram for this arrangement is shown in FIG. 10. There being four bridges and four levels of pulse grading, the step value between levels is 60/n, i.e. 15°, in order to achieve the continuity referred to above between positive and negative pulses. The transitions between the conduction periods are again symmetrically distributed between the pulse centre lines 21 and 22, being disposed at ±7½° and ±22½° off centre.

It may be seen that the cycle of conduction periods in each bridge is 150, 105, 150, 75, this sequence being staggered in time by 120° for succeeding bridges. These periods are obtained by successive delays from the standard 120° of 0°, 30°, 15° and 45°. The conduction periods contributing to each pulse are thus, similarly, 150, 105, 150 and 75, see for example the periods intersected by the pulse centre line 21.

It may be seen that the invention provides means and a method of operating a converter in which the harmonic content is, overall, greatly reduced.

I claim:

1. A bridge rectifier comprising a plurality of controlled-rectifier bridge circuits having common A.C. terminals and common D.C. terminals for connection to a load drawing a substantially constant D.C. current, and firing circuit means arranged to fire like-polarity controlled-rectifiers of each bridge circuit in phase sequence and to fire corresponding controlled-rectifiers of the plurality of bridge circuits in a sequence such that said corresponding controlled-rectifiers are rendered conductive for respective periods which overlap so as to provide regularly graduated A.C. current pulses.

2. A multi-bridge circuit multi-phase rectifier having common A.C. terminals and common D.C. terminals, each bridge circuit comprising positive controlled rectifiers connected to a positive D.C. terminal and negative controlled rectifiers connected to a negative D.C. terminal, and firing circuit means arranged to fire the positive controlled rectifiers in each bridge circuit in sequence and for a cycle of conduction periods which vary within the cycle by a predetermined delay and multiples thereof, the negative controlled rectifiers being fired in complementary manner, each bridge circuit being fired in the same cycle of conduction periods but staggered from bridge circuit to bridge circuit so that the conduction periods for the different bridges on any one phase contribute to a graduated A.C. current pulse.

3. A rectifier according to claim 1 having three A.C. phases.

4. A method of controlling a multi-bridge circuit multi-phase rectifier having common A.C. terminals and common D.C. terminals, each bridge circuit comprising positive controlled rectifiers connected to a positive D.C. terminal and negative controlled rectifiers connected to a negative D.C. terminal, wherein for each phase the positive controlled rectifiers are fired in sequence, the firing delays between bridge circuits being a multiple of a predetermined delay and the sequence being cycled through the bridge circuits, the negative controlled rectifiers being fired in complementary manner.

5. A method according to claim 4, wherein the number of bridge circuits is not a multiple of the number of phases and the firing sequence is cycled through the bridge circuits from phase to phase.

6. A method according to claim 4, wherein the number of bridge circuits is equal to or is a multiple of the number of phases and the firing sequences throughout a cycle of the A.C. system are cycled through the bridge circuits in successive cycles of the A.C. system.

7. A method according to claim 5, wherein the said firing delays are obtained as one combination of the successive multiples of said predetermined delay.

8. A method according to claim 7, wherein said combination is selected to exclude the most extreme periods of conduction.

* * * * *